United States Patent [19]

Porter

[11] Patent Number: 4,944,051
[45] Date of Patent: Jul. 31, 1990

[54] VEGETABLE WASHING ATTACHMENT FOR WATER FAUCETS

[76] Inventor: Mildred Porter, 2209 East 28th St., Kansas City, Mo. 64109

[21] Appl. No.: 448,539

[22] Filed: Dec. 11, 1989

[51] Int. Cl.[5] .............................................. B08B 3/02
[52] U.S. Cl. .......................................... 4/638; 4/654; 134/115 R; 134/198; 99/536; 239/289
[58] Field of Search .................. 4/628, 638, 654, 605, 4/656, 657, 658, 659, 289, 290, 292; 134/25.3, 115 R, 137, 198 X; 206/77.1; 383/117; 68/213; 422/266; 99/536; 239/289, DIG. 23

[56] References Cited

U.S. PATENT DOCUMENTS

| | | | |
|---|---|---|---|
| 62,082 | 2/1867 | Smith | 4/656 |
| 601,508 | 3/1898 | Fellows | 134/86 |
| 916,283 | 3/1909 | Eccleston | 4/656 |
| 950,559 | 3/1910 | Riegger | 248/213 |
| 1,116,543 | 11/1914 | Barker | 4/290 |
| 1,206,998 | 12/1916 | Curry | 4/654 |
| 1,233,431 | 7/1917 | Witt | 239/289 |
| 1,245,768 | 11/1917 | Randall | 134/198 |
| 1,273,259 | 7/1918 | Merrill | 422/266 |
| 1,300,248 | 4/1919 | Coleman | 422/266 |
| 1,658,944 | 4/1928 | Schaeffer | 4/572 |
| 1,998,002 | 4/1935 | Emmite | 134/151 |
| 2,100,165 | 11/1937 | Holmberg et al. | 4/292 |
| 2,179,932 | 11/1939 | Hartman | 239/289 |
| 2,322,417 | 6/1943 | Christian | 134/60 |
| 2,426,025 | 8/1947 | Justin | 4/292 |
| 2,535,967 | 12/1950 | Thiermann | 4/656 |
| 2,552,443 | 5/1951 | Molinari | 224/151 X |
| 2,601,364 | 6/1952 | Byrnes | 134/151 |
| 2,677,600 | 5/1954 | Young | 422/266 |
| 4,228,834 | 10/1980 | Desnick | 383/117 X |
| 4,466,146 | 8/1984 | Regan | 4/659 X |
| 4,503,561 | 3/1985 | Bruno | 383/117 X |

FOREIGN PATENT DOCUMENTS

| | | | |
|---|---|---|---|
| 993004 | 10/1951 | France | 383/117 |

*Primary Examiner*—Henry J. Recla
*Assistant Examiner*—R. M. Fetsuga
*Attorney, Agent, or Firm*—Hovey, Williams, Timmons & Collins

[57] ABSTRACT

A food washing attachment device (10) for suspending food (62) above a faucet (50) in the course of washing. The washing device (10) includes a bag (12) and rings (26-32). The rings (26-32) are used to solely support bag (12) so that the users hands maybe free to massage the bag body (18) during washing if desired. In preferred forms, the device (10) includes a sprinkler assembly (16) having a sprinkler member (34) attached to nozzle end (54) of faucet (50) by ring clamp (46). The lower end (40) of sprinkler member (34) supports ring (30 and converts a stream of water into a shower of droplets. The rings may be connected either to sprinkler assembly (16) or faucet (50) or taps (58-60) or some combination thereof, for solely supporting the device (10).

4 Claims, 3 Drawing Sheets

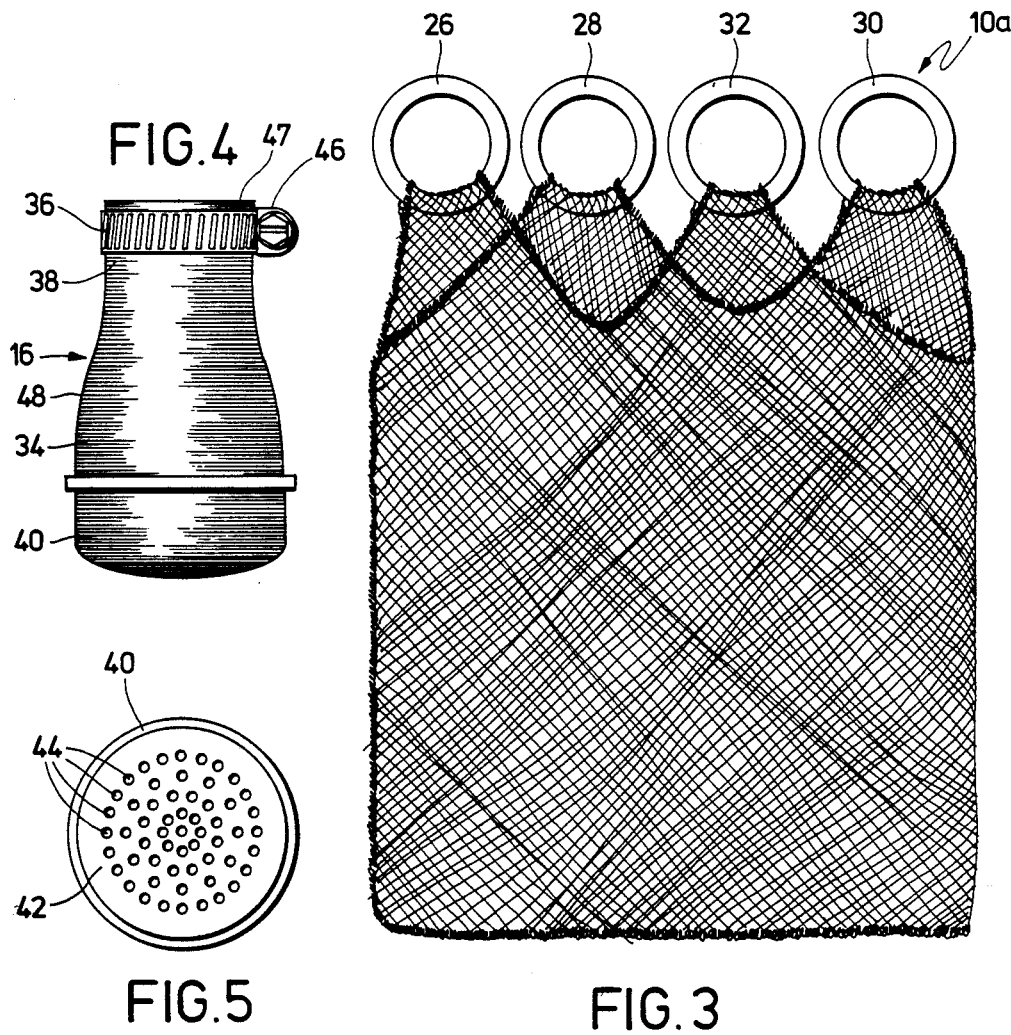

VEGETABLE WASHING ATTACHMENT FOR WATER FAUCETS

BACKGROUND OF THE INVENTION

1. Field of the Invention

This invention relates to a food washing device of simple yet highly effective construction which has numerous advantages including easy portability, flexibility, and ease of attachment to plumbing fixtures. More particularly, it is concerned with a food washing device having a porous bag utilizing attaching rings for connection to plumbing fixtures and the like.

2. Description of the Prior Art

Many devices have been invented for the purpose of washing food in the course of preparation Most such devices are adapted to be placed within a sink and usually include some kind of a frame structure to lay the food on. The problem with these inventions is that, typically, a rigid frame or structure is provided so that the food preparer cannot readily manipulate or massage the food under a stream of water. Further, the structural configuration of such inventions usually requires significant assembly and dismantling, such as connecting bolts and screws and the like and then hooking such an apparatus in the sink.

If the dimensions of the device are not well suited to a given sink, the device may not be of any practical value. Finally, none of the prior inventions have provided a means for positioning food so as to provide a modified stream of water, i.e. a stream of water converted into droplets for a more efficient washing of the food. A number of food washing devices have been proposed in the past. In general, however, as mentioned above, these units have not met the needs of food preparers because of the unsolved structural difficulties. Patents illustrating these prior units include U.S. Pat. Nos. 62,082, 601,508, 916,283, 950,559, 1,116,543, 1,300,248, 1,658,944, 1,998,002, 2,322,417, 2,426,025, 2,535,967, 2,601,364.

SUMMARY OF THE INVENTION

The problems outlined above are in large measure solved by the food washing attachment device in accordance with the present invention. That is to say, the washing device hereof is flexible, easily attached to one or more plumbing fixtures without any adaptations to the dimensions of the sink, and advantageously provides a stream of droplets for the efficient washing of food.

The food washing device in accordance with the present invention broadly includes a porous, flexible bag with an open end and at least one ring adapted to be releasably connected to a plumbing fixture so that the device is solely supported thereby. The ring is operatively disposed near the upper end of the bag so that when the ring is selectively connected to the fixture and food is placed in the bag, water may flow through the bag so that the food is efficiently cleaned.

In preferred forms, the number of rings is four so that two of the rings may be attached in a sink having two taps, with the other two rings being advantageously connected with the faucet. In particularly preferred forms, a sprinkler assembly is attached to the nozzle end of the faucet so as to hold one of the rings onto the faucet and deliver a stream of droplets within the interior of the bag.

BRIEF DESCRIPTION OF THE DRAWING

FIG. 3 is a side elevational view of an alternative embodiment of the present invention;

FIG. 4 is a side elevational view of a sprinkler assembly utilized in some embodiments of the present invention; and FIG. 5 is a bottom view of the sprinkler assembly of FIG. 4.

DESCRIPTION OF THE PREFERRED EMBODIMENT

Figure 2:
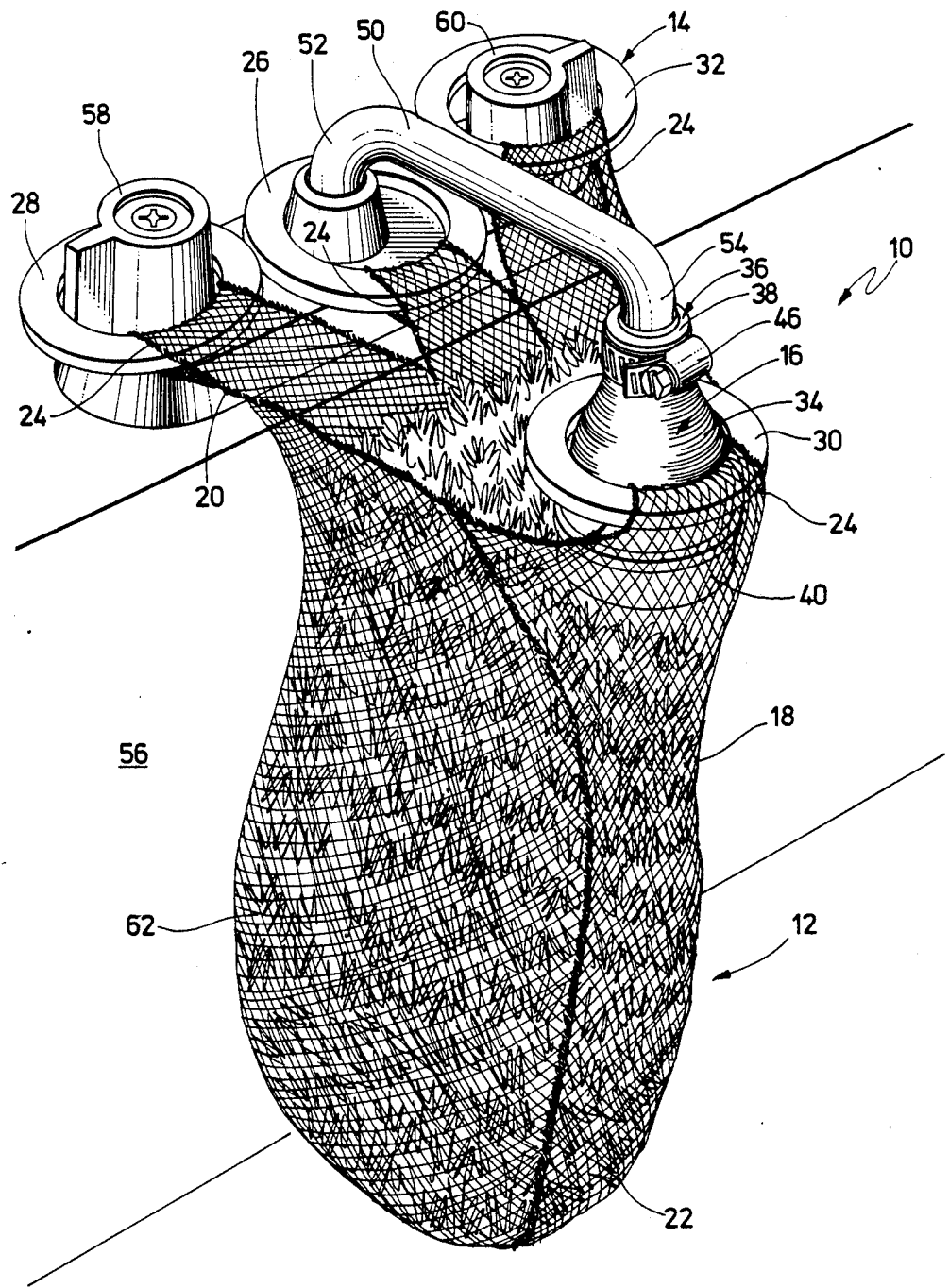
FIG. 2 is a perspective view of another orientation of the washing device of FIG. 1.

Referring now to the drawings in general, and FIG. 2 in particular, the preferred food washing attachment device 10 is shown connected to the taps and faucet of a conventional sink. The washing device 10 broadly includes a porous, flexible bag 12, support structure 14 and sprinkler assembly 16.

In more detail, bag 12 includes a body 18, having an upper open end 20 and a closed lower end 22 and integral ring loops 24. Body 18 can have any suitable volume such as large (for restaurant use), medium (for a large family) or small (for a small family). Body 18 can be constructed of any material so long as it is pliant and, in preferred embodiments, has a net-like weave.

Support structure 14 includes first through fourth rings 26–32. Each ring is fastened to bag 12 by an associated ring loop 24 integrally formed from bag 12.

Referring to FIGS. 4 and 5, sprinkler assembly 16 includes a sprinkler member 34 and fastening means 36. Sprinkler member 34 has a connection end 38 and a lower end 40 presenting an apertured face 42 having a plurality of apertures 44 thereon, suitable for converting a stream of water into a shower of droplets. Fastening means 36 in the preferred embodiment is a ring clamp 46 but any other convenient metal or synthetic resin apparatus for fastening the sprinkler member 34 could also be utilized. In preferred embodiments, sprinkler assembly 16 includes a separate, rigid collar 47 (see FIG. 4, where collar 47 is upwardly displaced from connection end 38 for ease of illustration). The diameter of lower end 40 is typically greater than that of the upper end 38 and this configuration of increasing diameter from top to bottom is noted by reference numeral 48. The diameter of lower end 40 is also greater than the respective inner diameters of rings 26–32.

Referring to FIG. 3, another embodiment, denoted 10a, is shown. It will be noted that this embodiment utilizes only first through fourth rings 26–32 and has no sprinkler assembly 16. Actually, any number of rings may be utilized as long as there is at least one—and a bag with at least one ring may be used with or without a sprinkler assembly. The embodiments depicted in FIGS. 2 and 3 are not exhaustive but rather illustrative.

In use, the rings are: (1) hooked on plumbing fixtures to support the bag; or (2) hooked initially on plumbing fixtures and then slid back so as to engage the sprinkler member; or (3) some combination thereof.

Referring once again to the preferred embodiment 10 of FIG. 2, the first ring 26 is first placed on a plumbing fixture such as faucet 50 having a ledge end 52 and a nozzle end 54. The nozzle end 54 is substantially horizontally suspended out over sink 56 in a conventional fashion. The first ring 26 is first received on nozzle end 54 and then slid the length of faucet 50 to ultimately rest on ledge end 52. Then the second and fourth rings 28 and 32 are respectively hung on taps 58, 60 and then third ring 30 is selectively placed on nozzle end 54 in such a fashion that nozzle end 54 addresses the interior of bag body 18. The connection or upper end 38 of sprinkler member 34 is then fastened on nozzle end 54. In this regard, collar 47 (not visible in FIG. 2) may first be placed on nozzle end 52 so as to fit snugly thereon so that connection end 38 is supported when fastened to nozzle end 54 of faucet 50.

In any event, connection end 38 of sprinkler member 34 is securely fastened to nozzle end 54 of faucet 50 by the tightening of the fastening means 36 such as ring clamp 46. The third ring 30 may then be slid downward so as come to rest on the lower end 40 of sprinkler member 34 at about reference numeral 48 (see FIG. 4). In this fashion washing device 10 is securely fixed to and solely supported by the plumbing fixtures of sink 56.

Food 62 such as leafy lettuce or the like is then placed in the interior of the body 18 of bag 12. At this point, the taps 58, 60 are turned on at the appropriate moment so that food 62 receives a shower of droplets via aperture face 42. The user may additionally manually massage the bag for optimum cleaning results but it will be readily understood that the user need not use his hands in any part of the cleaning process once the taps 58, 60 are turned on.

Figure 1:
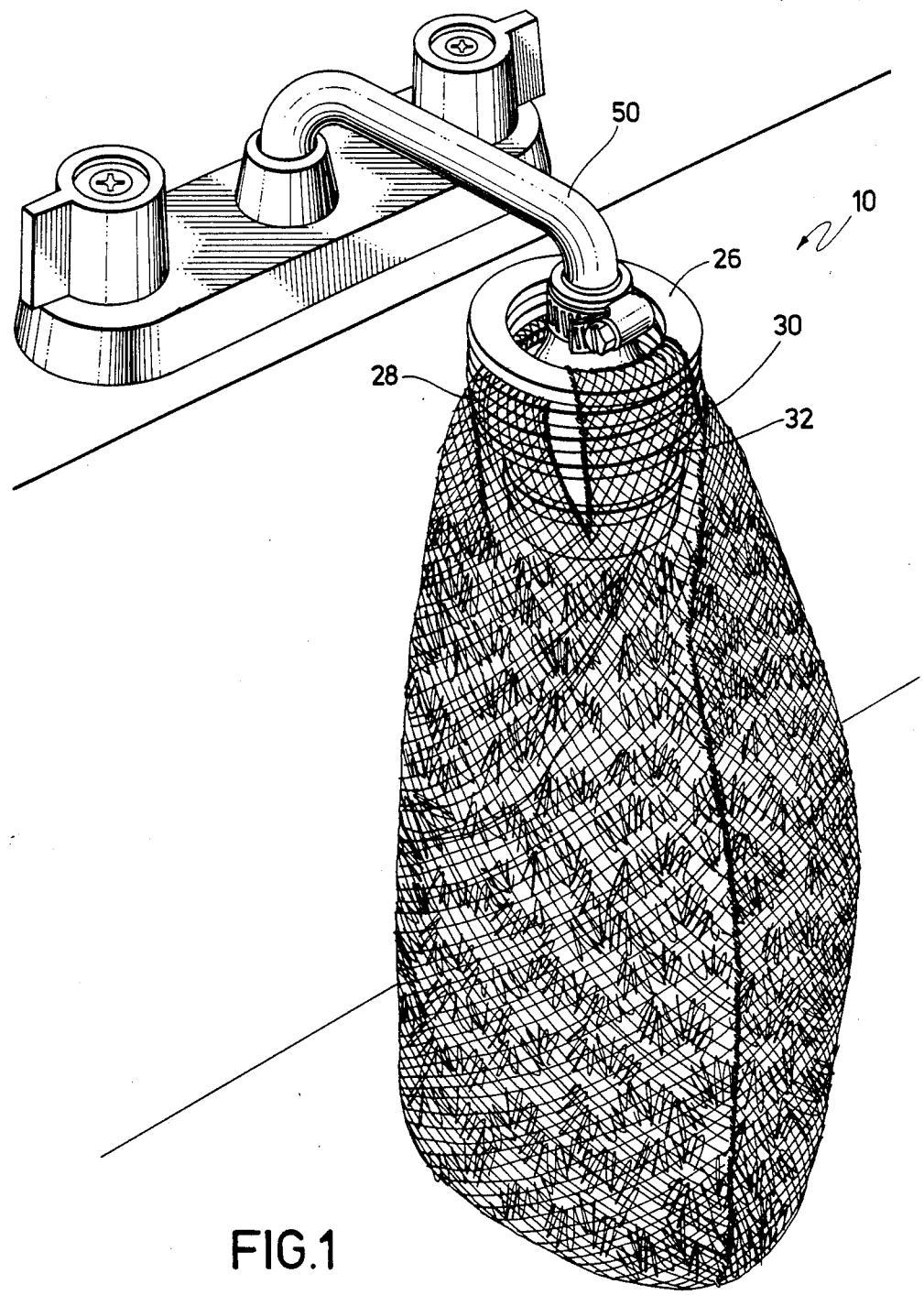
FIG. 1 is a perspective view of the preferred washing device in accordance with the present invention mounted on a typical faucet and tap system.

Referring to FIG. 1, an alternative utilization of washing device 10 is shown. In this use, rings 26-32 are looped onto faucet 50, then the sprinkler assembly 16 is fastened onto the nozzle end 54 and then rings 26-32 are placed back on the lower end 40 of sprinkler member 34. It will be readily appreciated that the washing device 10 could also be used such that the rings were oriented so that third ring 28 was simply suspended on the shaft of faucet 50.

As an additional alternative, an embodiment could provide just two rings to be placed on the taps 58 and 60, however it will be readily appreciated that at least three rings are optimum for such a use so as to engage either the shaft of faucet 50 or sprinkler assembly 16 for optimum indexing of the interior of body 18 of bag 12 with nozzle end 54. Ultimately, the only requirement for utilizing this invention is that the device have at least one ring capable of being supported by the faucet 50.

I claim:

1. A food washing attachment for washing food in a sink with two taps and a faucet having a ledge end and a nozzle end, the washing attachment comprising:
    a porous, flexible bag having an upper, open end and a pliant, net-like weave;
    at least four rings substantially evenly circumferentially spaced about and operatively coupled with said open end of said bag; and
    sprinkler means including a sprinkler member having a connection end, adapted to mate externally with the nozzle end of the faucet, and a lower end including an apertured face for converting a falling stream of liquid into a shower of droplets, said lower end having a greater outer diameter than the inner diameter of said rings, said sprinkler means further including such that when the first of said rings is received on said nozzle end and then slid the length of said faucet to said ledge end, and the second and fourth of said rings are hung on either tap, the third of said rings is selectively placed on the nozzle end, the connection end of said sprinkler member is secured on the nozzle end by said fastening means, and the third of said rings is thus supported by the outer diameter of said lower end of said sprinkler member, so that when food is placed in said bag and the taps are turned on, the food receives a shower of droplets thereon.

2. The food washing attachment of claim 1, wherein the number of said rings is four.

3. The food washing attachment of claim 1, wherein said fastening means includes a ring clamp presenting an adjustable diameter having a maximum value greater than the diameter of said connection end.

4. The food washing attachment of claim 1, wherein said sprinkler member is composed of a resilient material and said sprinkler means includes a rigid collar adapted to fit snugly on the nozzle end of the faucet so that said connection end of said sprinkler member is supported thereby when fastened to the rigid collar.

* * * * *